2,772,254

THERMO-SETTING RESIN

Anthony H. Gleason, Westfield, and Joseph F. Nelson, Rahway, N. J., assignors to Esso Research and Engineering Company, a corporation of Delaware No Drawing. Application January 30, 1953,
Serial No. 334,356

4 Claims. (Cl. 260—85.1)

This invention relates to the production of synthetic resinous materials which are completely insoluble, infusible, hard masses possessing good machineability and good dielectric properties.

It is known that linear polymers and copolymers of butadiene of an oily or rubber-like consistency can be cured at temperatures of 225–300° C. to form resins. These resins are similar to hard rubber except that no vulcanizing agent is used in their preparation. The products are characterized by having superior electrical properties. When prepared from a highly purified GR–S rubber they possess a power factor of about 0.0005 at $10^6$ to $10^9$ cycles and have therefore found use as an insulation material for radar equipment. They are also resistant to chemical action and physical impact.

The principal drawback in the production of such resins is that curing in the absence of air at temperatures of 225–300° C. poses a serious problem in manufacturing technique. When using rubbery polymers expensive high pressure molding equipment is also required.

It is the main object of the present invention to prepare these hard, resinous masses which are insoluble and infusible at elevated temperatures, from sodium polymers of butadiene and copolymers of butadiene and styrene.

It is a further object of this invention to prepare such resins in a simpler manner at lower temperatures.

These and other objects of this invention are accomplished by heating the polymers of butadiene or copolymers of butadiene and styrene at temperatures from 100 to 175° C. in the presence of 2.0 to 10% or more of ditertiary butyl peroxide.

The polymers to which the present invention is primarily applicable are those prepared by copolymerizing 100 to 50 parts of butadiene-1,3, and 0 to 50 parts of styrene with sodium. A particularly suitable polymer is an oily copolymer of 75 to 85% butadiene and 15 to 25% styrene. The polymerization is carried out in a reaction diluent at temperatures ranging from about 25 to 95° C., or preferably between 40 and 90° C., and is desirably continued until complete conversion of monomers is obtained. About 1.2 to 5 parts, preferably 1.5 to 4 parts, of finely divided metallic sodium per 100 parts of monomers are used as catalyst. Materials used as diluents in the polymerization are inert hydrocarbons which remain liquid under the reaction conditions employed. Accordingly, the diluents employed should have a boiling point between about 10 and 200° C., the low boiling diluents being useful where it is permissible to keep the reaction pressure sufficiently high to maintain the diluent in liquid condition at the reaction temperature used.

Preferred diluents are essentially aliphatic hydrocarbons such as naphtha having a boiling range between about 90 and 120° C., or straight-run mineral spirits such as "Varsol" having a boiling range between about 150 and 200° C. Butane, benzene, cyclohexane, xylenes, toluenes, pentanes and similar inert hydrocarbons are also useful, individually or in admixture with each other.

The hydrocarbon diluents are used in amounts ranging from 100 to 500, and preferably 150 to 300 parts per 100 parts of monomers. In other words, the resulting oily composition as synthesized normally contains about 20% to 50% of the polymer dissolved in a hydrocarbon solvent. When desired, more concentrated compositions can be produced from the synthesis product by stripping off excess solvent. For purposes of the present invention, it is desirable to concentrate non-volatile matter to at least 90 and preferably 100%. The presence of solvent is unnecessary and is undesirable except in small amounts.

Furthermore, to promote the original polymerization reaction and to assure the formation of a light colored product, it is also desirable to employ in the polymerization about 10 to 40 or more parts of an ether promoter per 100 parts of monomers. Cyclic diethers of 4 to 8 carbon atoms having an —O—C—C—O— group, such as dioxane-1,4 and its methyl and ethyl homologues, have been found as particularly effective promoters. Other suitable ether promoters are aliphatic mono- or di-ethers of 4 to 8 carbon atoms, such as diethyl ether, diethyl ether of ethylene glycol, and diethyl ether of diethylene glycol. Finally, it is also beneficial in many cases, although not essential, to use about 5 to 35 weight percent (based on sodium) of an alcohol such as methanol, isopropanol or n-amyl alcohol, especially where the sodium catalyst particles are relatively coarse.

The resulting product may vary from a low viscosity oil to a solid high molecular weight polymer and the invention is equally applicable to any such product of whatever intrinsic viscosity.

The present invention is based on the discovery that when products of the nature described above are heated in the presence of 2.5 to 3% by weight of t-butyl peroxide, the temperature at which curing occurs can be lowered to 100–175° C.

The curing should take place over a rising temperature range of 100 to 150° C. The rate of increase will vary inversely with the thickness of the sample being cured. A typical schedule is as follows:

Not less than about 8 hrs. at 100–110° C.
Not less than about 18 hrs. at 110–120° C.
Not less than about 18 hrs. at 120–130° C.
Not less than about 18 hrs. at 130–150° C.

The schedule may be lengthened somewhat depending on the hardness and distortion temperature desired in the resin, but a stepwise increase in curing temperature is desirable both as a means of controlling the rate of polymerization and to minimize mold adhesion. Too rapid curing can cause the castings to crack as a result of inadequate heat dissipation.

It may also be desirable to carry out the heating step in the additional presence of 0.01 to 10% by weight, of promoters such as maleic anhydride, chloro-maleic anhydride, and citraconic anhydride; and esters of fumaric, cinnamic, crotonic, and vinyl acetic acids, such as diallyl phthalate, diallyl maleate, diallyl sebacate and butyl acrylate as well as acrylonitrile are also suitable. However, if high dielectric properties are desired, the use of these promoters is not recommended since they tend to reduce the electrical resistance.

Fillers such as mica, asbestos, silica, Dicolite, etc., may be used to increase impact strength, improve the thermal conductivity, and shorten the curing time of these resins.

The resins obtained by the process of this invention have excellent dielectric properties. The dielectric constant is about 2.5 and the dielectric strength is about 800 volts per mil. They are not thermo-plastic and must be cast or machined to the desired shape. The specific gravity is in the range of 0.99 to 1.01 depending on the cure. Distortion temperatures may range up to 150° C. and higher. Under no load the resin possesses considerable form stability at temperatures above the distortion point. At a medium cure the resin will have a Rockwell-M hardness of about 100. The impact strength is adequate for commercial useage. The resin machines fairly well if sharp tools are used, giving cuttings which are fine and powdery.

The following examples illustrate the benefits to be obtained by the process of this invention.

*Example 1.*—An oily copolymer of butadiene and styrene was prepared according to the following recipe:

| | |
|---|---|
| Butadiene _____parts by wt__ | 80 |
| Styrene _____do____ | 20 |
| Naphtha _____do____ | 200 |
| Dioxane _____do____ | 30 |
| Sodium _____do____ | 1.5 |
| Isopropanol _____do____ | 0.3 |
| Temperature _____° C__ | 50 |

Complete conversion was obtained in eight hours. The catalyst was destroyed and removed from the resulting crude product. The product was finished to contain 100% non-volatile matter as described above. This product, having an intrinsic viscosity of 0.2, was mixed with 3% by weight of ditertiary butyl peroxide and 2% by weight of butyl acrylate at 75° C. The mixture was poured into a smooth, 3-inch diameter tin pan which had been given a light film of Silicone oil or polythene to prevent sticking. The casting was ½ inch thick. The pan and contents were placed in an electric oven and heated according to the following schedule:

18 hours at 105° C.
24 hours at 115° C.
24 hours at 125° C.
24 hours at 135° C.

The product had a Rockwell hardness of 96 and a distortion temperature of 87° C.

*Example 2.*—Copolymer-ditertiary-butyl peroxide mixtures containing 2, 3 and 4% of the latter were poured into molds 1" diameter, 6" long, and the following heating schedule observed:

12 hours at 110° C.
24 hours at 120° C.
24 hours at 130° C.
72 hours at 145° C.

The cured resins had a dielectric constant of 2.42 and a power factor of 0.0024 at $10^6$ cycles. Distortion temperatures were: 2%, 112° C., 3%, 150° C., and 4%, 150° C.

The nature of the present invention having been thus fully set forth and specific examples of the same given, what is claimed as new and useful desired to be secured by Letters Patent is:

1. A process for preparing a solid resin from a sodium copolymer of 100 to 50% butadiene 1, 3 and 0 to 50% of styrene which consists in heating the copolymer at a temperature between 110° C. and 175° C. in the presence of 2.0 to 4.0 of ditertiary butyl peroxide until a solid resin is obtained.

2. Process according to claim 1 in which the polymer is polybutadiene.

3. Process according to claim 1 in which the copolymer is an oily copolymer of 75 to 85% butadiene and 15 to 25% styrene.

4. A process for preparing a solid resin having high dielectric properties which consists in heating at a temperature of 100–105° C. on a rising temperature schedule for periods of 2 to 6 days in the presence of 2.5 to 3% of ditertiary butyl peroxide, a polymer prepared by heating a mixture of 80 parts by weight of butadiene, 20 parts by weight of styrene, 200 parts by weight of naphtha, 30 parts by weight of dioxane, 1.5 parts of sodium, and 0.3 part by weight of isopropanol to a temperature of 50° C. until the reaction is complete, destroying the catalyst and stripping off the naphtha.

References Cited in the file of this patent

UNITED STATES PATENTS

| | | |
|---|---|---|
| 2,275,951 | Farmer _____ | Mar. 10, 1942 |
| 2,646,418 | Lang _____ | July 21, 1953 |
| 2,683,162 | Gleason _____ | July 6, 1954 |